United States Patent [19]

Steele et al.

[11] Patent Number: 5,411,777

[45] Date of Patent: * May 2, 1995

[54] HEAT SHRINKABLE PROTECTIVE SHEETS

[75] Inventors: Robert E. Steele, Richmond Hill; Michael A. Romano, Hamilton; Peter Jackson, Etobicoke, all of Canada

[73] Assignee: Shaw Industries, Ltd., Rexdale, Canada

[ * ] Notice: The portion of the term of this patent subsequent to Jul. 28, 2009 has been disclaimed.

[21] Appl. No.: 164,995

[22] Filed: Dec. 10, 1993

Related U.S. Application Data

[63] Continuation of Ser. No. 660,866, Feb. 26, 1991, abandoned, which is a continuation-in-part of Ser. No. 519,473, May 7, 1990, Pat. No. 5,134,000, which is a continuation-in-part of Ser. No. 392,043, Aug. 10, 1989, abandoned.

[51] Int. Cl.⁶ .......................... B65D 65/02; B32B 7/00
[52] U.S. Cl. .................................. 428/34.9; 428/35.1; 428/35.2; 428/57; 428/192; 428/195; 428/212; 428/215; 428/349; 428/500; 428/913; 138/156; 138/170; 138/128; 138/104; 138/109; 174/DIG. 8
[58] Field of Search ....................... 428/35.1, 195, 215, 428/500, 349; 138/156, 170, 128, 104, 109; 174/DIG. 8

[56] References Cited

U.S. PATENT DOCUMENTS

| | | | |
|---|---|---|---|
| 3,770,556 | 11/1973 | Evans | 428/77 |
| 4,200,676 | 4/1980 | Caponigro | 428/57 |
| 4,268,559 | 5/1981 | Smuckler | 428/35.1 |
| 4,472,468 | 9/1984 | Tailor | 428/34.9 |
| 4,533,419 | 8/1985 | Pieslak | 428/57 |
| 4,582,737 | 4/1986 | Torgerson | 428/57 |
| 4,795,509 | 1/1989 | De Bruycker | 428/34.9 |
| 4,803,104 | 2/1989 | Peigneur | 428/57 |
| 5,134,000 | 7/1992 | Smythe et al. | 428/34.9 |
| 5,175,032 | 12/1992 | Steele et al. | 428/34.9 |

*Primary Examiner*—Ellis P. Robinson
*Assistant Examiner*—Rena L. Dye
*Attorney, Agent, or Firm*—Dickinson, Wright, Moon, Van Dusen & Freeman

[57] ABSTRACT

A heat shrinkable wrap-around sleeve comprises a heat shrinkable sheet with a heat stable strip welded on one end. The free end of the heat stable strip is overlapped on the outer side of the opposite end of the sheet and welded thereto by heating applied directly on the outer side. This allows the material of the strip to differ in its properties from the material of the sheet, so that the nature of welded closure can be tailored to particular applications. It also allows manufacture of sleeves having hold-down adhesives applied on them to be conducted with greater ease and economy. The sleeve can be manufactured using continuous welding, for example by heated wedge welding.

44 Claims, 4 Drawing Sheets

HEAT SHRINKABLE PROTECTIVE SHEETS

This application is a continuation of application Ser. No. 07/660,866, filed Feb. 26, 1991 which is now abandoned, which is a continuation-in-part of application Ser. No. 07/519,473 filed May 7, 1990 which is now U.S. Pat. No. 5,134,000, a continuation-in-part of application Ser. No. 07/392,043 filed Aug. 10, 1989 which is now abandoned.

The present invention relates to heat shrinkable protective sheets useful as protective coverings which may be used in, for example, sealing and protecting pipe weld joints, telephone cables, electrical splices, pipelines and the like, from adverse environmental conditions such as corrosion and moisture.

It is known to use for this purpose heat shrinkable tubular sleeves formed by extrusion. However, there is difficulty in extruding sleeves of any diameter but especially greater than about 12 inches (about 30 cm). The procedures for imparting a heat shrink memory to and for stretching the sleeves are complex and difficult as well.

Another general type of heat shrinkable covering is represented by the so-called "wrap-around sleeve", one example of which is disclosed in U.S. Pat. No. 4,200,676 to D.A. Caponigro. While wrap-around sleeves are more versatile than tubular sleeves in that they can be readily applied to articles, including large diameter pipes, which do not have an accessible exposed end, the closure systems by which the adjoining ends of the sleeve are interconnected are an inherent source of weakness. Mechanical closure systems are especially vulnerable to damage, while conventionally bonded overlaps can permit slippage during application and subsequently creep due to the hoop stresses remaining in the shrunk sleeves and so render the sleeves less effective than those which have a continuous covering.

These problems have been largely overcome by the method described in U.S. Pat. No. 4,472,468 in the name Tailor et al dated Sep. 18, 1984 assigned to the assignee of the present application, wherein a hold-down adhesive is used to bond together overlapped end portions of a heat shrinkable sheet before applying heat externally by means of a torch in order to weld the sheets together. However, the heat shrinkable sheets described in the Tailor et al patent provide limited freedom of choice of design of the welded closure. Moreover, usually the inner side of the sheet, that is, the side to be laid against the article to be protected, is lined with a functional coating. With the arrangement shown in the Tailor et al patent it is necessary to provide a zone which is free from functional coating on the underside of the overlap end in order to allow fusing of the overlap onto the outer side of the underlap end. In order to provide the coating free zone it has been necessary to employ a discontinuous method of applying the coating or to mask off the desired coating free areas of the sheet and then to strip off the masking material together with the coating after performing a continuous coating operation. These procedures are complicated and labour intensive.

The present invention provides a wrap-around sleeve in the form of a sheet of dimensionally heat unstable flexible material, on one end portion of which a closure strip is welded. In use, the sheet is wrapped around the article to be protected with the end portion having the closure strip overlapped on the opposite end portion. Direct heating can then be applied to weld the free edge of the closure strip to the underlapping end portion. Heating of the welded sleeve thus formed can then be applied in any conventional manner in order to shrink the sleeve down to form a protective wrapping around the article.

It is an advantage of the present sleeve that the closure strip may differ in character from the sheet material. For example, it can differ from the sheet material in its dimensional heat stability, its color, chemical composition, degree of crosslinking, thickness or in the method by which it has been crosslinked. The strip can differ from the sheet material in more than one of the above-mentioned respects. These arrangements provide advantages of design of the sleeve since the weldability and mechanical and other properties of the weld and closure zone can be tailored to suit the requirements of the application to which the sleeve is to be put.

In further preferred embodiments, a covering of a hold-down adhesive is provided across a transverse zone of a side of the closure strip to be overlapped on the said opposite end portion of the sheet. With this arrangement, a sleeve is provided having the advantages of the wrap-around sleeve disclosed in the above-mentioned Tailor et al patent but which can be manufactured with considerably greater ease and economy.

With prior attempts of which the inventors are aware, wherein two dimensionally heat unstable edges or pieces are welded together, problems have arisen in effecting a satisfactory weld.

One of the problems is that of peel back which occurs when two overlapping heat shrinkable sheets are heated. When heat is applied, the outside surface of the overlap tends to recover or shrink before the inside surface and thus there is differential contraction across the thickness of the sheets between the overlap and underlap. When heat is applied from one side only, the heat shrinkable sheet tends to curl upwardly or wrinkle as a result. These problems can be greatly mitigated with the structure of the invention. In one preferred form, the closure strip is dimensionally substantially heat stable, so that problems of peel back or curling do not occur. In a further preferred form, the strip has a degree of heat shrinkability which is approximately equal to or less than that of the sheet material, typically such that it exhibits on heating a longitudional shrinkage of about 2% to about 50%, based on the length of the unshrunk strip. When a dimensionally heat stable strip is heated, the strip tends to expand in all dimensions, especially with polymeric strips due to the volumetric increase associated with crystalline melting. With a closure strip having a degree of longitudinal shrinkage within the range of about 2% to about 25%, based on the length of the unshrunk strip, the shrinkage can be enough to offset this expansion phenomenon, but not enough to cause undue curling, wrinkling or peel back. More preferably, said shrinkage is about 5% to about 20%. The sheet material however typically may have a degree of longitudinal shrinkage of about 20% to about 80% based on the length of the unshrunk sheet. At these degrees of shrinkage, peel back, curling and wrinkling are serious problems which can normally be overcome only by use of a high strength and effective hold-down adhesive or a mechanical closure. When the shrinkage in the closure strip has a value in the range noted above, however, the demand on the hold down adhesive is reduced substantially, and there is much greater choice in selection of the same. As a result, with the present sleeve, it is possible when welding the closure strip to the underlapping end portion of the sheet to obtain welded bonds which are uniform and homogeneous. By "uniform" is meant that the weld is of substantially uniform peel strength along its entire length. By "homogeneous" is meant that the area or line of welding between the closure strip and heat unstable sheet does not present a line of weakness, so that when subjected to shear testing the welded joint does not fail along an interface corresponding to the boundaries of the original strip and sheet.

In some applications, the dimensionally heat unstable sheet material may typically have a shrink ratio of from about 1:1.05 to about 1:3.0, that is a shrinkage of about 5% to 67% based on the length of the unshrunk sheet.

A further respect in which the dimensional stability of the closure strip may differ from that of the sheet is that the closure strip may commence shrinkage at a temperature different from that of the sheet. Advantageously, the closure strip may commence to shrink at a temperature lower than the temperature at which the sheet commences shrinkage, preferably about 5° C. to about 15° C. lower. For example, the closure strip may commence shrinkage at about 100° C. and the sheet at 110° C. This arrangement has the advantage that it ensures establishment of contact of the closure strip with the sheet before the sheet begins to recover its original unstretched dimension. The closure strip will tend to become tacky at a lower temperature than the sheet and hence as the closure strip shrinks it will form a bond to the sheet before shrinkage of the latter commences.

The sheet material and strip are preferably organic polymeric materials, the same or different. For example, the material may be a polyolefin, a blend of polyolefins, or a blend of a polyolefin with an olefin copolymer, or with an elastomer, or with a mixture of these. Other polymeric materials which may be useful are elastomers such as butadiene-styrene copolymers, polybutadiene, silicone rubber, polybutene; plasticized polyvinylchloride, thermoplastic polyesters and polyurethane, ethylene propylene rubbers (EPDM) or blends of selected elastomers with polyolefins commonly referred to as thermoplastic elastomers. The most preferred polymeric materials are the polyolefins, e.g. polyethylenes, polypropylenes, various copolymers of ethylene and propylene, for example ethylene-ethylacrylate or ethylene-vinyl acetate copolymers in which repeat units derived from ethylene comonomer predominate (e.g. about 80% to 97%), and blends of such copolymers with polyethylene.

In advantageous forms of the present sleeve, the strip is formed of a material chemically different from sheet material. For example, the sheet material may be formed from any of the materials noted above and the strip from a polymer chemically structured such that it forms welds very effectively to the above noted sheet materials. Examples of such weld efficient polymers are well known to those skilled in the art. One preferred group of such polymers comprises weld efficient terpolymers of which examples include ethylene-vinyl acetate-methacrylic acid or acrylic acid polymers, EPDM polymers (ethylene-propylene-diene monomer polymers). Further well known examples are the polymers available under the trade-mark FUSABOND from Dupont Canada which are maleic anhydride modified polyolefins.

Such weld-efficient copolymers or terpolymers may be considerably more costly and less mechanically strong than the polymers typically used to produce the sheet material. It is therefore advantageous to form the closure strip of such weld efficient materials but to form the sheet of other polymers selected specifically for their cost and performance properties.

The dimensionally heat unstable sheet materials and the closure strips are preferably crosslinked polymeric material. In the case of, for example, a polyolefin or other polymeric dimensionally heat unstable sheet material, the material is preferably cross-linked to a degree of 25% to 85%, more preferably in the range 45% to 70%. In this connection, the degree of crosslinking of a given plastics material is definable by reference to solvent extraction tests conducted under standardized conditions on samples of the plastics. At zero crosslinking a solvent for the plastics will totally dissolve the plastics material, while a material which suffers no weight loss in such tests is regarded as 100% crosslinked. Intermediate degrees of crosslinking are indicated by proportionately intermediate percentage weight losses. For certain applications, it may be desirable that the closure strip is crosslinked to a degree somewhat higher than the dimensionally heat unstable material to which it is welded so that it will have good mechanical strength when hot during the procedure of shrinking down the wrap-around sleeve onto the pipe or other article during final use of the products. However, especially with sleeves wherein the sheet material is highly crosslinked, it can be advantageous to employ a closure strip which has a lower degree of crosslinking than the sheet. The degree of crosslinking often has a marked effect on the ease with which the weld can be effected. Generally speaking, the lower the degree of crosslinking, the easier and faster the weld can be achieved. However, a low degree of crosslinking in the sheet would result in a sleeve which has a sluggish response to heating and is prone to melting and sagging. It is advantageous to be able to compensate for a higher crosslink in the sheet by a lower crosslink in the closure strip in order to promote ease and effectiveness of welding without sacrificing responsiveness of the sleeve to heating.

Advantageously, the method employed to crosslink the closure strip may be different from that used for the sheet material. Examples of methods which may be used for crosslinking include exposure to ionizing radiation, blending of the polymer with organic peroxides, and formation of pendant silane groups on the polymer and exposure of the polymer to moisture to crosslink the silane groups. Each of these methods is in itself well known, as are the conditions employed to achieve desired degrees of crosslinking, and need not be described in detail herein. Briefly, exposure to ionizing radiation in order to crosslink polymers is frequently conducted either by exposure of the polymer to gamma rays from radioactive sources such as cobalt-60 or to high energy electrons from electron accelerators. Crosslinking by blending with peroxides includes blending polymers with selected small quantities of organic peroxides appropriate for the particular polymer to be crosslinked. Examples of commonly used peroxides include $\alpha$, $\alpha'$-bis (t-butylperoxy) diisopropyl benzene and dicumyl peroxide. Treatment with silane may include grafting a silane such as vinyl silane to a polymer such as an ethylene polymer or copolymerizing a silane, for example a vinylsilane, with an olefin or like monomer. In either case a polymer having pendant silane groups is formed. The resultant polymer is then crosslinked by exposure to moisture, for example in the form of steam. The crosslinking mechanism consists of hydrolysis and condensation of the pendant silane groups. Each of these crosslinking procedures has its own benefits and limitations and the properties of the crosslinked products can be markedly different even at the same degree of crosslinking. Accordingly, by selection of different crosslinking methods products having properties suited for particular applications can be obtained. For example, electron beam crosslinking is advantageous for crosslinking of continuous sheet material at very high speeds for subsequent use as the sheet material component, of which greater quantities are normally required. Silane crosslinking results in a more 3-dimensional crosslinked structure which imparts higher tensile properties at temperatures above the crystalline melting point of the polymer. Therefore, at the same degree of crosslink, a silane crosslinked polyolefin or like polymer is often more resistant to being stretched and thinned out than an electron beam cured one. As a result, it is advantageous to use a silane crosslinked closure strip which can have a lower degree of crosslink than a beam-cured sheet material, allowing easier welding of the closure strip to the sheet material without sacrificing resistance to being stretched thin by the retractive forces of the sleeve.

It is a further advantage of the sleeves of the invention that the closure strip may be of a different colour from the sheet material. For example, the closure strip may be transparent or somewhat translucent while the sheet material may be opaque. A pattern of thermochromic paint may be applied on the underside of and be visible through the closure strip, which guides the installer by providing a visual indication, for example a color change, when sufficient heat has been applied so that the temperature needed to achieve a satisfactory weld has been reached. Optionally, should it be desired to employ infra red heating, selected infra red absorptive additives such as copper phthalocyanine which do not substantially impair its transparency may be included in the closure strip.

Alternatively, the closure strip may be of a color different from the sheet material, for example black, which more effectively absorbs infra-red radiation, for cases in which infra-red heaters are used to weld the wrapped-around sleeve.

Use of a different color can also make it easier for an inspector to determine the location of the overlap area. It is frequently recommended that the wrap-around sleeve should be positioned in a specific orientation on a pipe or other article in order to promote filling of the underlap with functional coating material. By having the closure strip of a color distinctly different from the sheet, an inspector can at a glance determine that, firstly, the sleeve was positioned properly and, secondly, the closure strip was put over the sheet material rather than under it.

Preferably, in order to provide a protective covering with good strength properties, the recovered thickness of the sheet materials and closure strips, which may be the same or different, are about 0.01 to about 0.2 inches more preferably about 0.02 to about 0.1 inches. In some circumstances it is advantageous to use a closure strip thinner, than the sheet in order to reduce the thickness at the overlap area and make it easier to get heat through to a pipe or other article to be covered and to a functional coating which may require heating to achieve its greatest effect. Preferably the closure strip is about 10 to about 80% thinner than the sheet, based on the thickness of the sheet, more preferably about 30 to about 60% thinner. Conversely, and especially where the sheet material exhibits a high degree of shrinkage, it is advantageous to employ a closure strip thicker than the sheet material in order to provide greater resistance to thinning out of the closure strip as a result of the shrinkage forces. In such case the closure strip is preferably about 10 to about 80% thicker than the sheet, based on the thickness of the sheet, more preferably about 20 to about 60% thicker.

Advantageously, the inner side of the dimensionally heat unstable sheet material, that is, the side to be laid against the article to be protected, is lined with a functional coating. The coating may be, for example, a sealant, an adhesive material, a mastic, a grease, or a two-component curable composition. In the case in which the coating is an adhesive, this holds the sleeve more firmly on the article and reduces any tendency for the sleeve to become dislodged from the article. Mastics, when employed, can function both as an adhesive and as a sealant to effect a seal between the covering and the article. Examples of greases which may be employed include water-repellent greases such as silicone greases. These can be particularly useful when forming an insulating covering around telephone cables or electrical splices. Examples of two-component curable compositions which may be employed include heat-curable epoxy or urethane compositions which can form a corrosion-protective layer over the surface of a pipe to which the covering is applied.

Examples of suitable sealants include hot-melt adhesives. Hot-melt adhesives for this purpose are well known in the art. However, as will be apparent to those skilled in the art, many fluid materials, which may be organic or inorganic and which may or may not be crystalline at ambient temperature and are rendered substantially non-crystalline on heat application can be used as the sealant. The important requirement, where adhesive sealant is used, is that it should be capable of flowing during the further heating step so as to allow unrestrained recovery of the sheet, to fill any voids and to effect a seal between the surface of the article and the sleeve as the latter shrinks.

Advantageously, a covering of a hold-down adhesive is provided across a transverse zone of a side of the closure strip to be overlapped on the opposite end portion of the sheet material. In use, the hold-down adhesive performs a function of facilitating welding of the overlap closure strip to the underlap sheet analogous to that performed by the hold-down adhesive described in the Tailor et al U.S. Pat. No. 4,472,468 referred to above. The nature of the hold-down adhesive, and its manner of application and use are described in detail in the Tailor et al patent, which is incorporated herein by reference for its disclosures in the above respects.

Briefly, the hold-down adhesive performs the function of holding down the closure strip on the sheet when applied to an article to be protected while the strip is being welded to the sheet. If the adhesive is pressure sensitive, the overlap is secured to the underlap merely by pressing the overlapping portions together. When heat is first applied at the overlap, the adhesive prevents slippage at the interface as the material tends to shrink and also prevents the overlap from curling and peeling back during the initial heat application. Suitable shear-resistant adhesives are well-known to those skilled in the art.

The preferred materials are iso-butylene polymers, such as polyisobutylene, polybutene, and butyl rubber. These polymers can be partially cured to increase the shear-strength particularly at elevated temperatures. Other isobutylene polymers that are useful include halogenated butyl rubbers, and other modified butyls for example terpolymers in which divinylbenzene is added to impart a cure (e.g. Polysar's XL-20 and XL-50) and filled, plasticised and partially cured masterbatch crumb (e.g. Columbian Carbon's Bucar 5214). An appropriate quantity and grade of polyisobutylene (Vistanex) may also be used to impart a desired tack (pressure sensitive) property according to the formulation. Addition of fillers is useful in adjusting tack and the cohesive strength of the adhesive. The fillers suitable for the application include carbon black, mica, graphite, talc, asbestos, aluminium hydrate, clays, hydrated silicas, calcium silicates, silicate-aluminates, fine furnace and thermal blacks, magnesium carbonate, and calcium carbonate. The preferred fillers, however, are carbon blacks and talcs.

Other adhesive materials useful for the hold-down application include those based on nitrile rubbers, styrene-butadiene rubbers, styrene-isoprene rubbers, neoprenes, polyurethanes, ethylenevinyl acetate, acrylates, (e.g. ethylene-ethyl acrylate), silicones, poly-vinyl-acetate, amino resins, amorphous polypropylenes and polyvinylacetals. These adhesives may be of the hot-melt type, contact cement type, lacquer type, thermosetting adhesive type, pressure sensitive adhesive type, cross-linked adhesives, or two component adhesives. Many variations of adhesive systems used are possible; for example, a pressure sensitive transfer tape with a thin polymeric liner sandwiched between two pressure sensitive adhesive films can be applied to the overlap and so that one adhesive film is bonded to overlap and the adhesive film on the other side can be adhered to the underlap (e.g. J-Tape, 266P and other tapes from Adchem Corp. U.S.A.).

The hold-down adhesive may also be a material which is not pressure sensitive at ambient temperatures but which develops pressure-sensitivity when heated. In such case, the adhesive-covered zone may be carefully heated to render the adhesive tacky and bond it to the underlap. The adhesive may be heated by applying heat directly to the adhesive material before applying the sleeve to the article.

Sleeves having a functional coating on the sheet material and a hold-down adhesive stripe or like covering on the closure strip can be readily manufactured in a continuous fashion by:

(a) manufacture of bulk rolls comprising a functional coating disposed continuously on heat shrinkable continuous sheet material;

(b) manufacturing the closure strip material in continuous sheet form;

(c) cutting the heat shrinkable sheet material to length;

(d) feeding the sheet material and the closure strip material simultaneously through a continuously operating welding apparatus; and (e) applying a hold-down adhesive to the closure strip.

In step (d) the closure strip material may be fed either in continuous form if unstretched, or normally in discrete pieces if the strip material has been stretched continuously longitudinally.

Preferably the hold-down adhesive is fed continuously in the form of a layer on a release paper to the closure strip as it feeds through the welding apparatus. The closure strip material, if welded continuously to the lengths of sheet material, is cut to separate the product into individual sleeves, after the welding operation and preferably after the hold-down adhesive has been applied.

This process is sufficiently simple that sleeves can be effectively and economically be manufactured from bulk rolls of the continuous sheet material and continuous closure strip material at locations remote from the site of manufacture of the sheet and closure strip material, for example at warehouses.

The protective wrap-around sleeve of the present invention may be manufactured using, for example, the induction welding techniques which are described in more detail in United States patent application Ser. No. 07/392,043 filed Aug. 10, 1989, the disclosure of which is incorporated herein by reference.

In the preferred form, the protective wrap-around sleeve is manufactured by drawing the strip and sheet continuously over opposite sides of a heated member, the heating of which is controlled, in order to melt surface portions of the strip and the sheet, and then bringing the melted surface portions into contact. By carefully controlling the heating of the heated member, it is possible to heat only a thin skin portion of the strip and sheet in contact with the heated member to the temperature required to effect fusion. Surprisingly, it has been found that this welding method allows a satisfactory uniform and preferably homogeneous weld to be achieved between materials one or both of which are dimensionally heat unstable, without problems such as peel back or puckering of the welded portions occurring. The key to the successful use of this method is to ensure that only a very thin layer of each surface is heated to the temperature required to effect fusion when the two surfaces are subsequently brought into contact. If too great a thickness is heated, the materials will deform due to thermal expansion or to heat-induced shrinkage, and this will result in poor mating of the surfaces and consequent inadequate welds and/or unacceptable appearance.

In the preferred form, this welding method is conducted using heated wedge welding apparatus, wherein the heated member is in the form of a wedge, which apparatus is in itself known and was used before the present invention for welding together fabric-reinforced polymer films or sheets, or other dimensionally heat stable films or sheets, for example in the manufacture of waterproof clothing.

Such welding apparatus and its use is described in a number of prior patents:

| U.S. Pat. Nos.: | |
| --- | --- |
| 2,387,556 | 3,322,593 |
| 3,607,544 | 4,146,419 |
| 4,605,578 | 4,737,212 and |
| 4,744,855 | | as well as in published U.K. patent application 2,082,500A dated Mar. 10, 1982 in the name Gundle Holdings.

The above noted patents and U.K. patent application are hereby incorporated herein for their disclosures of heated wedge welding machines and their methods of use.

In the most preferred form, the heated wedge is equipped with thermistor controlled heating. This allows very accurate control over and precise maintenance of the temperature of the wedge, thus allowing close control of the thickness of the melted skin on the surface of the materials undergoing welding.

In some advantageous applications of the abovementioned welding method, the edges being welded together may, for example, be the abutting longitudinally opposite ends of a piece of dimensionally heat unstable material having its ends brought together to form a tubular sleeve and the edges of a heat fusible but normally at least relatively dimensionally heat stable closure tape overlapping the outer side of one or both of said ends.

In other advantageous applications, the two edges may be, for example, two overlapped ends of a single piece of the at least relatively dimensionally heat unstable material again forming a tubular sleeve. Alternatively, the edges may be, for example, those of a panel of heat fusible but relatively dimensionally heat stable panel applied over the overlap area of the overlapped ends of a piece of dimensionally heat unstable sheet material and extending a small distance over the exposed outer side of the underlap end portion. In such case normally the whole of the dimensionally heat stable panel is welded to the exposed outer sides of the overlap and underlap portions. With these procedures, heat shrinkable tubular sleeves are obtained.

In the preferred form, however, for producing the heat shrinkable wrap-around protective sleeves described above, the edges to be welded are the edge of a heat fusible closure strip overlapped on one end edge of a longitudinally heat shrinkable sheet. As noted above, the free end of the strip extends a sufficient distance that when the two ends of the sheet are brought together and the end having the panel overlapped on the opposite end, the free end of the strip can be applied on the outer side of the underlap end. This product is useful as a wrap around sleeve. Advantageously, the closure strip differs in diameter from the sheet in one or more of the above mentioned respects, so that the weldability and mechanical and other properties of the weld and closure zone can be tailored to suit the requirements of the application to which the sleeve is to be put. In the field, in applying the sleeve around a pipe or the like, the free end of the closure strip is welded onto the outer side of the underlap end by direct heating applied thereon, for example with a propane flame or other torch flame, before being shrunk down onto the pipe or other article by application of heating in the normal manner.

Various embodiments of the method of the present invention will now be described by way of example only with reference to the accompanying drawings in which.

Figure 1:
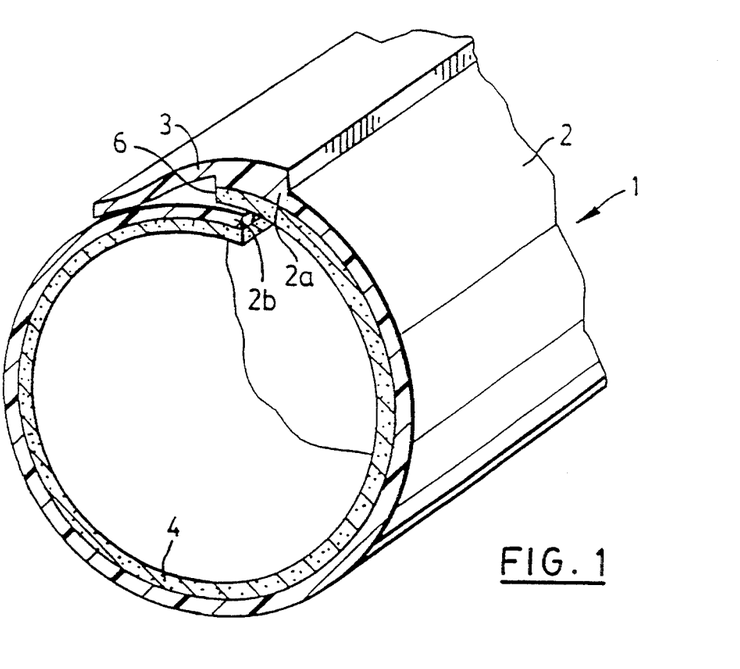
FIG. 1 shows partially schematically and partially in perspective a welded wrap-around sleeve in accordance with the invention.

Referring to the drawings, wherein like numerals indicate like parts, FIG. 1 shows a wrap-around sleeve 1 comprising a longitudinally heat shrinkable flexible polymeric sheet 2 having longitudinal end portions 2a and 2b. A closure strip, for example a relatively heat stable polymeric strip 3 is welded on the end portion 2a. The strip 3 is of sufficient width that when in use, the sleeve 1 is wrapped around an article to be protected (not shown), for example a pipe, with portions 2a overlapping on portion 2b, the free end of the strip 3 can be heated and/or pressed down onto the outer side of the sheet 2 and can be welded thereto by applying heat directly on the outer side of strip 3, using, for example, a propane torch or the like.

The inner side of the sheet 2 is coated with a functional coating 4.

In one preferred form, the strip 3 is clear. The underside of the strip 3 may be provided with a conventional temperature sensitive indicator, for example a pattern of thermochromic paint, visible through the clear strip 3, which provides a visual indication of, for example, a colour change, when a temperature is reached at which the strip satisfactorily welds to the sheet 3. Usually, the coating 4 is softened by the heating subsequently applied to the sleeve 1 in the course of shrinking it down, and the hoop stress in the sleeve 1 causes the coating 4 to extrude to fill the channel or transition 6 between the end of the sheet 2 and the underside of the strip 3. Visual inspection of the coating 4 which fills the channel 6 provides the user with further visual assurance of the effectiveness of the seal provided by the shrunk-down sleeve.

Figure 2:
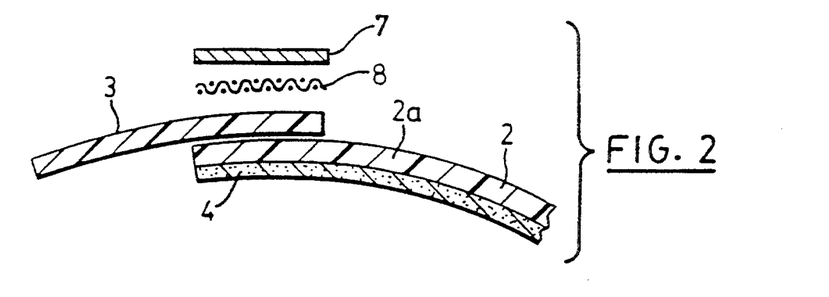
FIGS. 2 and 3 are cross-sections illustrating a welding procedure and the welded product, respectively.

In FIG. 2, an inductively heatable susceptor strip 7, for example a steel strip, is applied on the outer side of the closure strip 3 and the assembly is pressed together and inductively heated as described in patent application Ser. No. 07/392,043 by exposure to an rf field. Heat is transferred from the strip 7 to the overlapping strip 3 and portion 2a which fuse together. A release film 8, for example of PTFE, may be used between the susceptor strip 7 and the closure strip 3 so that the film 8 and susceptor strip 7 may be easily removed from the welded product after completion of the weld.

Figure 3:
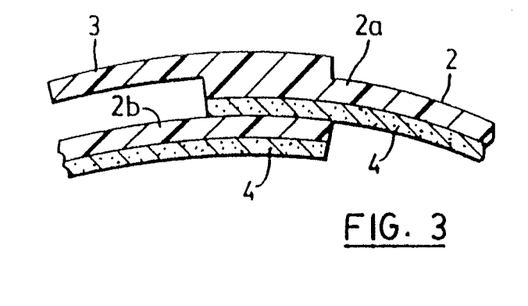

FIG. 3 shows the end 2a bearing the fused on strip 3 overlapped on end 2b for welding thereto as described above with reference to FIG. 1.

Figure 4:
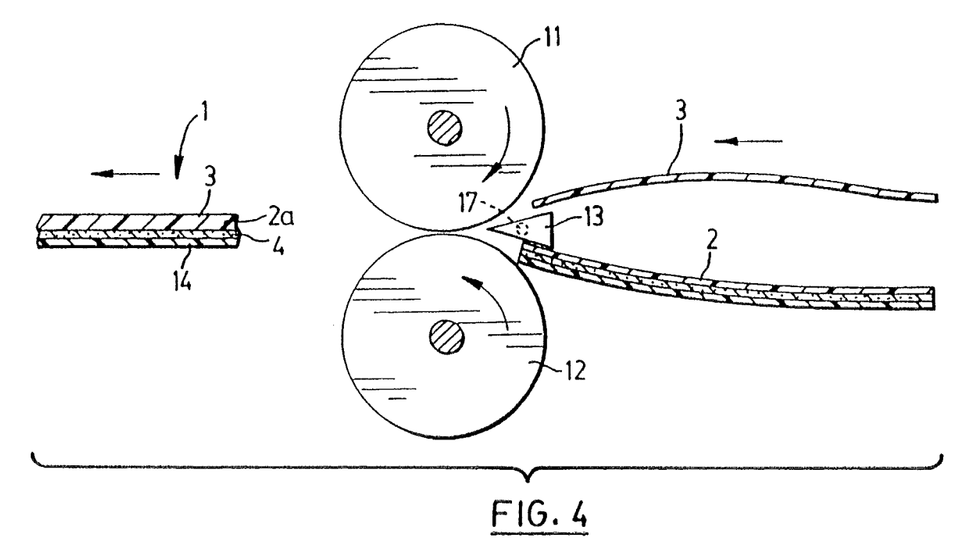
FIG. 4 is a partially schematic side view, partially in cross-section, illustrating a further welding method in accordance with the invention.
Figure 5:
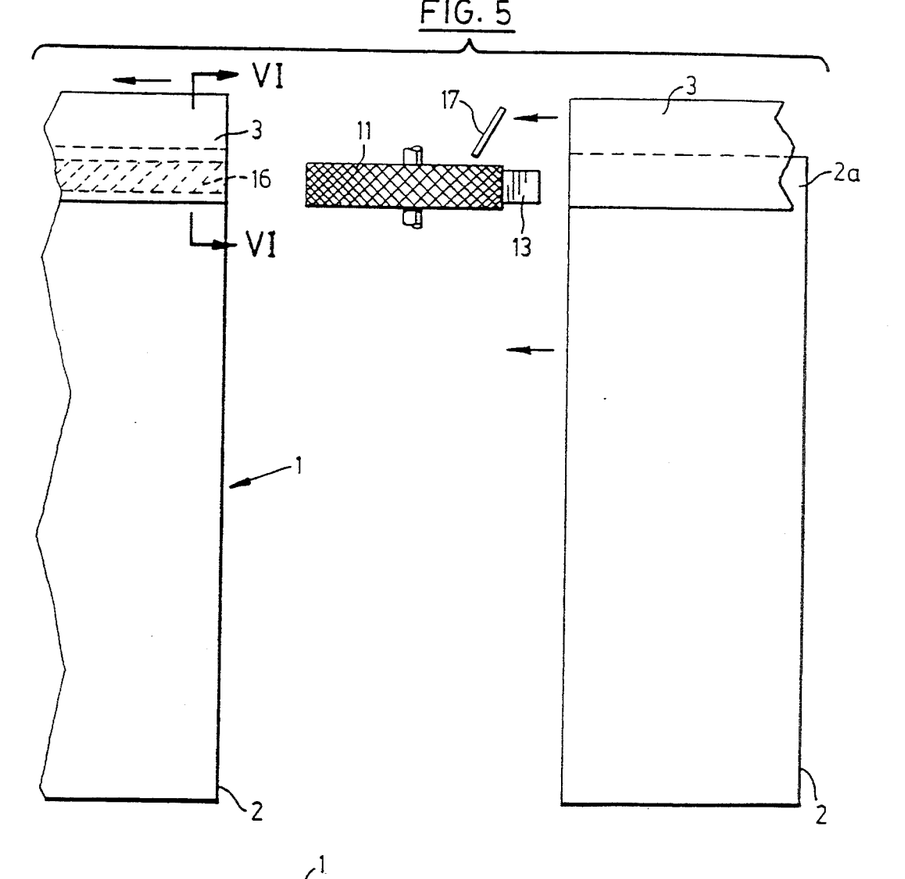
FIG. 5 is a plan view corresponding to FIG. 4.

In FIGS. 4 and 5, there are shown the driven pressing or nip rollers 11 and 12 and heated wedge 13 of a heated wedge welding machine such as, for example, a machine of the kind available from Pfaff Industriemaschinen GmbH, Federal Republic of Germany.

The strip 3 and sheet 2 in superposed relationship are fed in from one side of the wedge 13. As the lower side of the strip 3 and the upper side of the sheet 2 pass over the surfaces of the wedge 3, thin surface skin portions thereof become heated dependent upon the temperature of the wedge 13, which is closely controlled. The materials 2 and 3 are then engaged by the nip of the rolls 11 and 12 and are drawn through the rolls and are pressed together thereby so that the heated surface portions are fused together.

Figure 6:
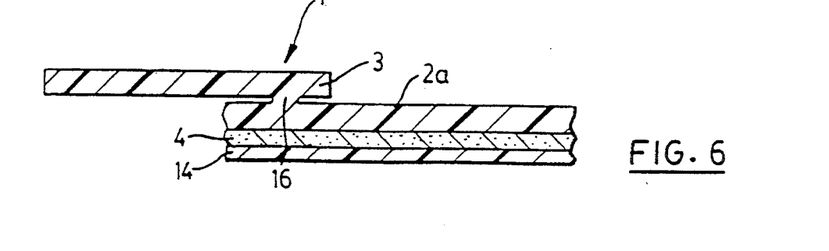
FIG. 6 is a cross-section taken on the line VI—VI in FIG. 5.

The welded wrap-around sleeve product is seen partially in mutually perpendicular cross sections in FIGS.

4 and 6. In this example, the functional coating 4 is covered with a release liner in the form of a self supporting strippable polymer film 14 which is removed before use of the sleeve.

As seen in FIGS. 5 and 6, the width of the zone 16 which is heated by the wedge 16 and fused between the rollers 11 and 12 may be narrower than the lateral extent of the overlap between the strip 3 and the end portion 2a.

The side of each of the rollers 11 and 12 may be milled as seen in FIG. 5 to improve the grip on the strips and sheets drawn therethrough.

The strip 3 may be supplied to the welding apparatus in the form of a continuous strip from a roll thereof and may be severed or trimmed to the width of the sheets 2 by guillotine blades disposed upstream from the rollers 11 and 12.

A gas nozzle 17, inclining toward the axis of the wedge 13 and rollers 11 and 12 in the direction of movement of materials over the wedge 13, may be provided adjacent the rollers 11 and 12 and wedge 13 through which a gas which does not interfere with the welding method and materials, such as air, oxygen or nitrogen is flowed. As presently understood, it appears that a superior weld is achieved when the materials undergoing welding are bathed in a flow of gas during the steps of heating and fusion together.

Advantageously, the sides of the sheet 2 and strip 3 that are welded together have a matte or an embossed surface.

Typically, in the manufacture of polymeric wraparound sleeves, the wedge 13 will be maintained at a temperature of about 200° to about 350° C., preferably about 220° to about 320° C., and the surface drive speed of the rollers 11 and 12 will be in the range about 5 to about 50 ft./min., preferably about 5 to about 45 ft./min. The gap between the rollers 11 and 12 will preferably be set such that when the materials to be welded pass through the nip of the rolls a laminating wheel back pressure of about 15 to about 45 psi, preferably about 20 to about 35 psi is generated.

Figure 7:
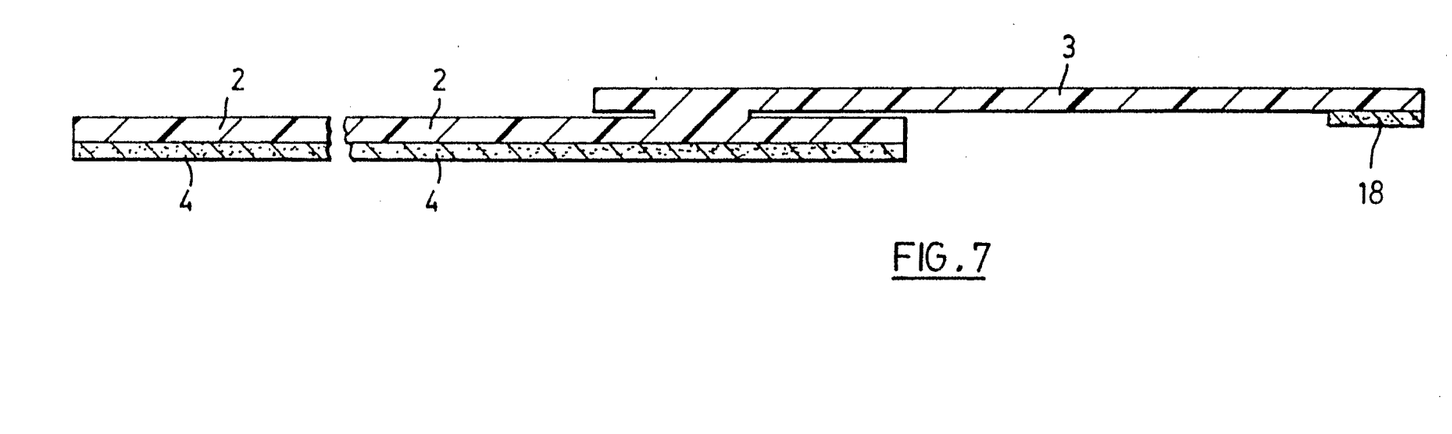
FIGS. 7 and 8 are cross-sections through further forms of welded product having hold-down adhesive coverings applied thereto.

FIG. 7 shows a further form of sleeve having a stripe 18 of hold-down adhesive, seen in cross-section, extending across the full length of the closure strip 3. In use, when wrapped around an article such as a pipe, in the configuration seen in FIG. 1, the stripe 18 secures the free end of strip 3 on the outer side of the opposite end of the sheet 2 until the strip 3 is completely welded to the sheet 2.

The embodiment of FIG. 7 may be manufactured conveniently using welding apparatus similar to that described above with reference to FIGS. 4 and 5 but comprising two sets each of the welding stations formed by the rollers 11, 12 and wedge 13, disposed in spaced parallel arrangement. Two pieces of the sheet material 2 are disposed symmetrically on each side of a common piece of the closure strip material 3, having a stripe of the hold-down adhesive applied down its median, this stripe being twice the width of the stripe 18. After the welding the double workpiece is cut along the middle of the wide stripe of adhesive to yield two completed sleeves each of the forms shown in FIG. 7 having the transverse stripe of adhesive at the free end of the strip 3.

In applications in which the welded sleeve is exposed to soil stress, the version shown in FIG. 7 may be vulnerable to damage, since there may be a tendency for soil to work its way under the free edge of the overlap where the bond strength of the adhesive 18 is relatively weak as compared with the bond strength of welded together area of the strip 3 and sheet 2.

Figure 8:
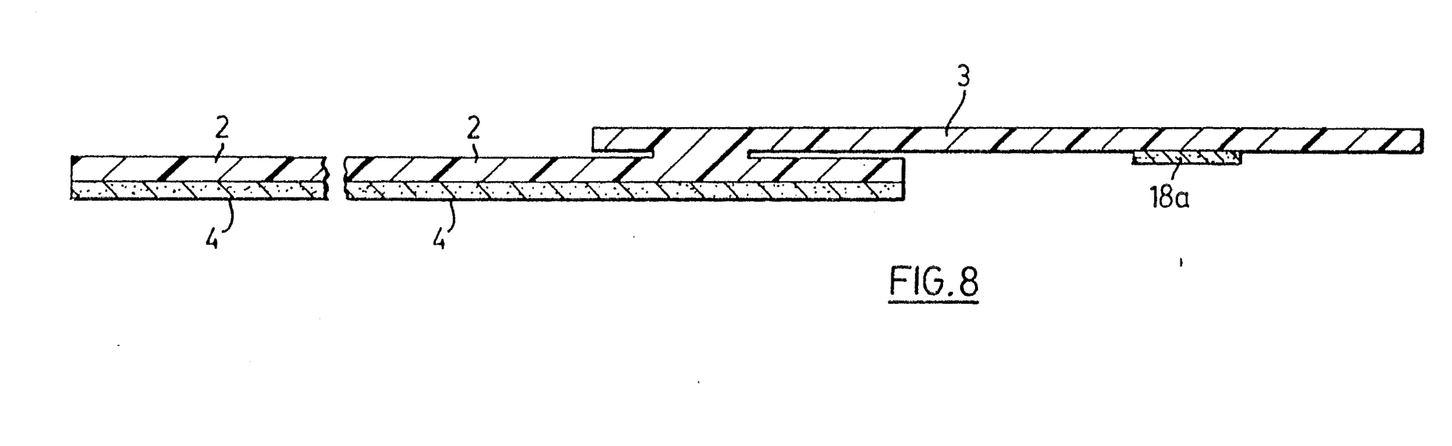

In such cases it may be more desirable to employ the version shown in FIG. 8 wherein the adhesive stripe 18a is spaced inwardly for the free edge of the strip 2. In use, the exposed outer edge of the overlap is a welded joint, which may be better able to withstand soil stress and like stresses. The embodiment of FIG. 8 may be manfuactured in the manner generally described above with reference to FIG. 7 but with less convenience since two separate applications of the hold-down adhesive stripes 18a have to be made to each double workpiece.

Although the above description provides ample information to enable one skilled in the art to conduct the present welding methods and to fabricate the welded products, for the avoidance of doubt some detailed examples of the methods in accordance with the invention will be given:

EXAMPLE 1

The procedure described above with reference to FIGS. 2 and 3 was followed using the following materials and conditions.
Heat Shrinkable Sheet
Composition: blend of 40% EVA[1] and 60% LDPE[2]
Thickness: 0.035 inch (stretched)
Shrinkage on heating: 23%
Degree of crosslinking: 61 %
Notes:
  (1) 12% vinylacetate and 88% ethylene-vinylacetate copolymer (MFI=1 dg/min)
  (2) low density polyethylene (MFI=2.0 specific gravity=0.919)
Functional coating
Composition: asphaltic mastic
Thickness: 1.5 mm
Substantially Heat Stable Closure Strip
Composition: blend of 40% LDPE (as above) and 60% LLDPE linear low density polyethylene MFI=2.3, SG=0.917)
Thickness: 0.030 inches
Width: 3.0 inches
Degree of crosslinking: 75%

The stainless steel susceptor strip was 0.015 inches thick and 0.5 inches wide and was applied on the overlap portion of the closure strip at a point spaced between the free end of the heat shrinkable sheet and the real edge of the closure strip, so that portions on either side of the steel susceptor strip were left unwelded. The susceptor strip was enveloped in PTFE fabric as a release covering. The assembly was clamped between platens and was exposed to an rf field for 10 seconds using a 10 KW Westinghouse 4 megahertz RF generator type 20 K65, set at 9.45 grid tuning and 5.5 power (output reading 300 amps). The assembly was compressed at 80 psi between the platens. After the field was switched off, the platens were left closed for 10 to 20 seconds to allow internal coolant within the platens to cool the susceptor strip before the platens were opened.

EXAMPLE 2

Example 1 was repeated except the susceptor strip was used without any release covering and was applied direct to the upper side of the closure strip.

The power setting was 4.0 (150 amps), and the field was applied for 15 seconds. The pressure between the platens was 80 psi.

EXAMPLE 3

Example 1 was repeated except the susceptor strip was 1.0 inch wide and was positioned adjacent the rear edge of the closure strip so that only an overlap portion adjacent the free end of the heat shrinkable sheet was left unfused.

The power setting was 5.5 (300 amps), the field was applied for 10 seconds and the platen pressure was 80 psi.

EXAMPLE 4

Example 3 was repeated except the susceptor strip had no release covering and was applied direct to the upper side of the closure strip.

The power setting was 4.0 (150 amps), the field was applied for 15 seconds and the platen pressure was 80 psi.

EXAMPLE 5

The procedure described above with reference to FIGS. 4 to 6 was followed using the following materials and conditions.
Heat Shrinkable Sheet
Composition: blend of 60% LDPE (MFI=2, SG=0.919) and 40% EVA (12% VA, MFI=1, SG=0.932), together with small amounts of additives such as colorant and antioxidant.
Thickness: 0.035 inch
Shrinkage on heating: 30%
Crosslinking: electron beam crosslinking characterized by 20 psi tensile at 300% elongation and 990% ultimate elongation at 135° C.
Functional Coating
Adhesive: 0.050 inches thick on obverse of heat shrinkable sheet with release liner.
Substantially Heat Stable Closure Strip
Composition: same as heat shrinkable sheet
Thickness: 0.028 inch
Crosslinking: electron beam crosslinking characterized by 90 psi tensile at 300% elongation and 520% ultimate elongation at 135° C.

The welding was performed using a Pfaff model no. 8309-124 hot wedge welding machine equipped with a thermistor controlled heated wedge. The wedge temperature was maintained at 274° C., the drive speed of the nip rolls at 22 ft./min., and a gap of 0.107 inches was set between the nip rolls. The back pressure between the nip rolls, as indicated by the gauge on the machine, was 30 psi. A flow of nitrogen gas was provided to bathe the area adjacent the wedge and nip rolls.

When subjected to peel strength testing DIN 30672 method 1, the weld had peel strength of 22 lb./in. The failure was cohesive, that is to say the strip and sheet did not peel apart but failed by elongation of the strip or of the sheet. The weld was homogeneous.

EXAMPLE 6

The procedure of Example 5 was repeated except for the following:
Heat Shrinkable Sheet
Composition: blend of 40% LDPE (as in Example 5) and 60% LLDPE (linear low density polyethylene, MFI=2.3, SG=0.917) plus additives as in Example 5.
Thickness: 0.034 inch
Shrinkage on heating: 25%
Crosslinking: electron beam crosslinking to 25 psi tensile at 300% elongation and greater than 1080% ultimate elongation at 135° C.
Functional coating
Adhesive: 0.066 inch thick on obverse of backing with release liner.
Substantially Heat Stable Closure Strip.
Composition: same as heat shrinkable sheet of this Example
Thickness: 0.032 inches
Crosslinking: Electron beam crosslinking characterized by 90 psi tensile and 820% ultimate elongation at 135° C.

The welding was performed under the same wedge temperature and drive speed as Example 5. The gap between the rolls was set at 0.115 inch and the back pressure was 20 psi. The welding area was bathed with a flow of air.

The peel strength of the weld was 24lb./in. The failure was cohesive (indicating a homogeneous weld) with elongation of the strip. The lap shear testing (ASTM ID 1002) gave tensile failure of the backing and strip at greater than 42 psi.

EXAMPLE 7

The procedure of Example 5 was followed except for the following:
Heat Shrinkable Sheet
Composition: LMDPE (linear medium density polyethylene, MFI=2.5, SG=0.935) plus additives as in Example 5.
Thickness: 0.024 inch
Shrinkage on heating: 25.9% Crosslinking: Electron beam crosslinking to 85 psi tensile and 860% ultimate elongation at 135° C.
Functional Coating
Adhesive: 0.064 inch thick on obverse of backing with release liner.
Substantially Heat Stable Closure Strip Same as Example 6.

The welding was performed at a wedge temperature of 232° C., drive speed 15 ft./min., gap was set at 0.110 in. and the back pressure was 30 psi. Oxygen gas was supplied to bathe the welding area.

The weld had 5 lb./in. peel strength and failed adhesively (along the interface between the strip and sheet). The weld was not homogeneous but was uniform and would be adequate for some purposes. The weld had greater than 42 psi lap shear strength tensile failure of the sheet and strip.

EXAMPLE 8

The procedure of Example 5 was followed except:
Heat Shrinkable Sheet

Same as Example 5.

Functional Coating
Adhesive: 0.050 inches thick on obverse of heat shrinkable sheet with release liner.
Substantially Heat Stable Closure Strip
Composition: Same as Example 5
Thickness: Same as Example 5
Crosslinking: Electron beam crosslinking characterized by 45 psi tensile at 300% elongation and 740% ultimate elongation at 135° C.

The welding was performed with a wedge temperature of 315° C., drive speed of 8 ft./min., the gap was set at 0.107 inches, and the back pressure was 30 psi. Oxygen gas was supplied to the welding area.

In peel strength testing the weld failed cohesively (greater than 24 lb./in. peel strength) and the weld exhibited greater than 30 psi lap shear with tensile failure of the sheet and the strip.

Comparative Example 1

A heat shrinkable wraparound sleeve of the design shown in FIG. 6 of U.S. Pat. No. 4,472,468 (Tailor et al) was produced from a mixture of low density polyethylene (LDPE) and ethylene vinyl acetate copolymer (EVA) in the ratio of 1:1 by weight. The degree of crosslinking was 65%, the stretch was 30%, and the sheet material thickness was 0.046 inch recovered. The functional coating consisted of a 0.065 inch thick layer of a mastic typical of corrosion protection systems, and the hold-down adhesive stripe was a non-flowing tacky butyl compound.

The sleeve was applied to a steel pipe using the following procedure:
(a) Starting first with the end opposite the closure area, the sleeve was wrapped around the pipe such as to leave about one-half inch of slack. The outside end of the sleeve was adhered by applying firm finger pressure to the sheet material along the hold-down adhesive.
(b) Using a propane torch, the closure area was heated gently to recover the bare area and form an initial weld.
(c) Using a stronger flame, the remainder of the sleeve was shrunk, starting in the middle and moving outward toward one end, then repeating for the other end.
(d) Additional heat was applied to the closure area, using end-to-end strokes, to complete the formation of the weld.

During the shrinking operation, a tendency to wrinkle and curl-back was noted along the outermost edge over the hold-down adhesive. This required some additional patting down. In addition, the rapid shrinkage typical of these levels of stretch resulted in some small bubbles of air trapped between the two layers of backing in the weld area, and these were seen to be susceptible to burning through.

After cooling the peel strength of the weld was tested in a peeling mode. Failure occurred in a smooth cohesive fashion indicating an acceptable weld, except where air pockets were encountered.

EXAMPLE 9

A mastic coated yellow heat shrinkable sheet, identical in composition, crosslink and stretch to that referred to in Comparative Example 1, but with no bare area or hold-down adhesive, was prepared. To this was welded, using a heated wedge welder, in the manner described above with reference to FIGS. 4 and 5, a closure strip of crosslinked LDPE/EVA mixture identical in colour, composition and recovered thickness to that of the backing. However, the degree of crosslink was higher due to a higher electron beam dose, and the material was not stretched. A hold-down adhesive stripe was applied to the free end of the closure. The sleeve was then applied to the pipe in a manner identical to that described in Comparative Example 1.

During initial application of heat to the weld area, some buckling of the closure occurred due to thermal expansion not countered by any built-in recoverability. However, once a bond had been established adjacent to the hold-down adhesive stripe, and the remainder of the sleeve was shrunk, the resulting hoop stress caused these buckled areas to lie essentially flat, with only a few small pockets of trapped air. Due to the lack of stretch, no wrinkling was observed along the leading edge of the closure.

After cooling, the peel characteristics of the weld were tested in the same manner as in Comparative Example 1, with similar results. This illustrates that the use of an unstretched closure is effective in eliminating wrinkling and curl-back of the leading edge, but has the adverse effect of causing initial wrinkling or buckling due to thermal expansion, increasing the danger of air entrapment between the two surfaces to be fused.

EXAMPLE 10

To a heat shrinkable sheet identical to that described in Example 9 was welded, in the manner described in Example 9, a closure strip of the same composition, except that it was unpigmented (i.e. translucent), and was stretched only 10%. The underside of the closure strip was printed with a thermochromic ink composition designed to change colour from blue-green to black at 120° C. The hold-down adhesive stripe was applied in such a way as to leave one inch of bare closure strip overhanging it. This sleeve was then applied to a pipe in a manner identical to that described in Comparative Example 1.

During the initial application of the heat to the overlap area, the closure strip responded quickly, conforming well to the surface below it, and becoming crystal clear. After completion of the shrinking process, additional heat was applied in long, end to end strokes until the thermochromic indicator changed colour. The resultant sleeve showed no sign of bubbles or entrapped air, and the leading edge was welded down firmly.

After cooling, the peel characteristics of the weld were tested as in Comparative Example 1, and excellent, uniform cohesive failure was observed. This example demonstrates the value of being able to use a translucent closure in conjunction with a thermochromic indicator to give a visual indication to the installer as to when sufficient heat has been applied to establish an excellent weld. It also demonstrates that it is advantageous with weldable closure systems to be able to independently select the degree of stretch in the closure strip and in the sheet material. In this particular case, the 10% stretch in the closure strip provided enough recoverability to eliminate the adverse thermal expansion effects of the unstretched closure strip, as seen in Example 9, and the adverse effects of the highly stretched closure area in the single piece sleeve as seen in Comparative Example 1. Finally, this example demonstrates the value of indenting the adhesive hold-down strip so as to allow the leading edge of the closure strip to weld to the backing, resulting in a firmly secured edge which is more resistant to being lifted than is the case in systems relying on the soft, tacky hold-down adhesive.

EXAMPLE 11

A heat shrinkable sheet composed of a mixture of high density polyethylene (HDPE), ethylene-propylene-diene monomer terpolymer (EPDM), and carbon black was prepared. The recovered thickness was 0.046 inches, the degree of stretch was 30% and the crosslinking was effected by exposure to 8 Mrad of electron radiation. To this was laminated a 0.065 inch thick layer of a mastic typical of those used in corrosion protection applications. A weldable closure strip, composed of the same material, except being 0.036 inches thick and not stretched, was welded onto one end of the heat recoverable sheet using a heated wedge welder in the manner described in Example 9, and a stripe of hold-down adhesive was applied to the underside of its free-end. The sleeve was then applied to a pipe in the same manner as described in Comparative Example 1.

During application of the sleeve, the same problems were noted as in Example 9,—ie—some initial wrinkling, and some residual air pockets and bubbles. The peel strength was 25 pli.

EXAMPLE 12

A sleeve was prepared from the same backing, and in the same manner, as described in Example 11, except that the closure strip was ethylene-vinyl acetate-maleic anhydride terpolymer (Dupont Fusabond) which had been crosslinked via a 9 Mrad dose of electron radiation.

After application as described in Comparative Example 1, the resulting weld had a peel strength of 39 pli. This demonstrates, in comparison to Example 11, the value of being able to use a different material for the weldable closure strip than is used for the remainder of the sleeve in order to provide an enhanced weld. (The terpolymer is much more expensive, and not as tough as the HDPE/EPDM mixture, and is therefore not as suitable for use as the sleeve backing.)

We claim:

1. A heat shrinkable wrap-around sleeve adapted to be applied to an article in wrapping relation thereto comprising a sheet of dimensionally heat unstable flexible material having longitudinally spaced end portions capable of being brought into overlapping relation when the sheet is applied to the article, the material having been stretched in the longitudinal direction from an original heat stable form to a dimensionally heat unstable form capable of moving in the direction of its original form by the application of heat alone, and a crosslinked dimensionally heat unstable closure strip having one edge disposed on one of the end portions of said sheet and welded thereto, said strip being of sufficient width that when the end portions of the sheet are brought together and the end portion having the closure strip is overlapped on the opposite end portion, the free edge of the closure strip can be applied on the underlapping end portion and welded thereto by direct heating applied thereon, said closure strip having a covering of a hold-down adhesive across a transverse zone of a side of the closure strip to be overlapped on said opposite end portion; and wherein said closure strip exhibits shrinkage in said longitudinal direction on heating of about 10% to about 50% based on the length of the unshrunk strip.

2. A sleeve as claimed in claim 1 wherein said sheet exhibits on heating a longitudinal shrinkage of about 5% to about 67% based on the length of the unshrunk sheet.

3. A sleeve as claimed in claim 1 wherein said sheet exhibits on heating a longitudinal shrinkage of about 20% to about 80% based on the length of the unshrunk sheet.

4. A sleeve as claimed in claim 1 wherein said closure strip exhibits on heating a longitudinal shrinkage of up to about 25% based on the length on the unshrunk strip.

5. A sleeve as claimed in claim 4 wherein said shrinkage is up to about 20%.

6. A sleeve as claimed in claim 1 wherein said closure strip commences shrinkage at a lower temperature than said sheet.

7. A sleeve as claimed in claim 6 wherein said closure strip commences shrinkage at a temperature about 5° C. to about 15° C. lower than said sheet.

8. A sleeve as claimed in claim 1 wherein said strip is translucent or transparent.

9. A sleeve as claimed in claim 8 having a thermochromic indicator on the underside of and visible through said clear strip.

10. A sleeve as claimed in claim 1 wherein said strip contains a colorant different from a colorant contained in said sheet.

11. A sleeve as claimed in claim 1 wherein said strip and sheet material are of different chemical composition and each is a polyolefin, a blend of polyolefins, a blend of a polyolefin with an olefin copolymer or with an elastomer or with a mixture thereof, an elastomer, a thermoplastic elastomer, or a mixture thereof.

12. A sleeve as claimed in claim 1 wherein said strip is a weld efficient polymer and said sheet material is a polyolefin, a blend of polyolefins, a blend of a polyolefin with an olefin copolymer or with an elastomer or with a mixture thereof, an elastomer, a thermoplastic elastomer, or a mixture thereof.

13. A sleeve as claimed in claim 1 wherein said sheet material is crosslinked to a degree of about 25% to about 85%.

14. A sleeve as claimed in claim 13 wherein said strip is crosslinked to a degree lower than said sheet material.

15. A sleeve as claimed in claim 13 wherein said strip is crosslinked to a degree higher than said sheet material.

16. A sleeve as claimed in claim 13 wherein said sheet material is crosslinked to a degree of about 45% to about 70%.

17. A sleeve as claimed in claim 16 wherein said strip is crosslinked to a degree lower than said sheet material.

18. A sleeve as claimed in claim 1 wherein the recovered thickness of said sheet material and said strip are each about 0.01 to about 0.2 inches thick.

19. A sleeve as claimed in claim 18 wherein said thicknesses are each about 0.02 to about 0.1 inches.

20. A sleeve as claimed in claim 1 wherein said sheet material has a functional coating on its inner side.

21. A sleeve as claimed in claim 20 wherein said functional coating is a sealant or an adhesive material.

22. A sleeve as claimed in claim 1 wherein the hold-down adhesive is a pressure sensitive adhesive.

23. A sleeve as claimed in claim 22 wherein the hold-down adhesive is an isobutylene polymer, or a blend of isobutylene polymers, with a filler.

24. A sleeve as claimed in claim 1 wherein the hold-down adhesive is not pressure-sensitive at ambient temperature but develops pressure-sensitivity when heated.

25. A sleeve as claimed in claim 1 wherein the hold-down adhesive is constituted by a strip of double-sided adhesive transfer tape.

26. A sleeve as claimed in claim 1 wherein the recovered thickness of said sheet material is about 0.01 to about 0.2 inches thick.

27. A sleeve as claimed in claim 1 wherein said sheet material is about 0.02 to about 0.1 inches thick.

28. A sleeve as claimed in claim 26 wherein said strip is about 10 to about 80% thinner than said sheet material, based on the thickness of the sheet material.

29. A sleeve as claimed in claim 27 wherein said strip is about 10 to about 80% thinner than said sheet material, based on the thickness of the sheet material.

30. A sleeve as claimed in claim 24 wherein said strip is about 30 to about 60% thinner than said sheet material, based on the thickness of the sheet material.

31. A sleeve as claimed in claim 27 wherein said strip is about 30 to about 60% thinner than said sheet material, based on the thickness of the sheet material.

32. A sleeve as claimed in claim 26 wherein said strip is about 10 to about 80% thicker than said sheet material, based on the thickness of the sheet material.

33. A sleeve as claimed in claim 27 wherein said strip is about 10 to about 80% thicker than said sheet material, based on the thickness of the sheet material.

34. A sleeve as claimed in claim 26 wherein said strip is about 30 to about 60% thicker than said sheet material, based on the thickness of the sheet material.

35. A sleeve as claimed in claim 27 wherein said strip is about 30 to about 60% thicker than said sheet material, based on the thickness of the sheet material.

36. A sleeve as claimed in claim 1 wherein said transverse zone is at the free edge of said closure strip.

37. A sleeve as claimed in claim 1 wherein said transverse zone is spaced inwardly from said free edge of said closure strip.

38. A sleeve as claimed in claim 1 wherein said closure strip has different dimensional heat stability from said sheet.

39. A sleeve as claimed in claim 1 wherein said closure strip has different color from said sheet.

40. A sleeve as claimed in claim 1 wherein said closure strip has different chemical composition from said sheet.

41. A sleeve as claimed in claim 1 wherein said closure strip has different degree of crosslinking from said sheet.

42. A sleeve as claimed in claim 1 wherein said closure strip has different thickness from said sheet.

43. A sleeve as claimed in claim 1 wherein said closure strip has been crosslinked by a method different from said sheet.

44. A sleeve as claimed in claim 43 wherein said methods by which said sheet material and strip have been crosslinked comprise methods selected from the group consisting of exposure to ionizing radiation, blending with organic peroxides and formation of a polymer containing pendant silane groups and exposure to moisture to crosslink said silane groups.

* * * * *

UNITED STATES PATENT AND TRADEMARK OFFICE
CERTIFICATE OF CORRECTION

PATENT NO. : 5,411,777
DATED : May 2, 1995
INVENTOR(S) : STEELE, et al.

It is certified that error appears in the above-indentified patent and that said Letters Patent is hereby corrected as shown below:

IN CLAIM 1, COL. 17, LINE 60, CHANGE "10"

TO -- 5 --.

Signed and Sealed this

Thirty-first Day of October 1995

Attest:

BRUCE LEHMAN

Attesting Officer    Commissioner of Patents and Trademarks